United States Patent [19]

Reed

[11] 4,437,255

[45] Mar. 20, 1984

[54] FISH DETECTING SYSTEM

[76] Inventor: Dorian Reed, 13231 Northfield Blvd., Oak Park, Mich. 48237

[21] Appl. No.: 371,466

[22] Filed: Apr. 23, 1982

[51] Int. Cl.³ ............................................. A01K 93/00
[52] U.S. Cl. ...................................... 43/17; 340/668
[58] Field of Search ................... 43/16, 17; 200/84 C, 200/82 E; 340/668

[56] References Cited

U.S. PATENT DOCUMENTS

| | | | |
|---|---|---|---|
| 3,382,598 | 5/1968 | Wilson | 43/17 |
| 3,608,227 | 9/1971 | Adams | 43/17 |
| 3,997,744 | 12/1976 | Higo | 200/84 C |

FOREIGN PATENT DOCUMENTS

| | | | |
|---|---|---|---|
| 1162925 | 9/1969 | United Kingdom | 43/17 |
| 861265 | 9/1981 | U.S.S.R. | 340/668 |

*Primary Examiner*—Nicholas P. Godici
*Assistant Examiner*—Marc Hodak
*Attorney, Agent, or Firm*—Fisher, Gerhardt, Crampton & Groh

[57] ABSTRACT

A fish detecting system including a radio transmitter in a float attached to a fishing line and a receiver at a point remote from the line. The float includes a power source and a normally open switch between the power source and transmitter. A switch actuator is magnetically held in a switch open position and moved by fish activity to magnetically move the switch to a closed position energizing the transmitter to send a signal to the receiver.

10 Claims, 4 Drawing Figures

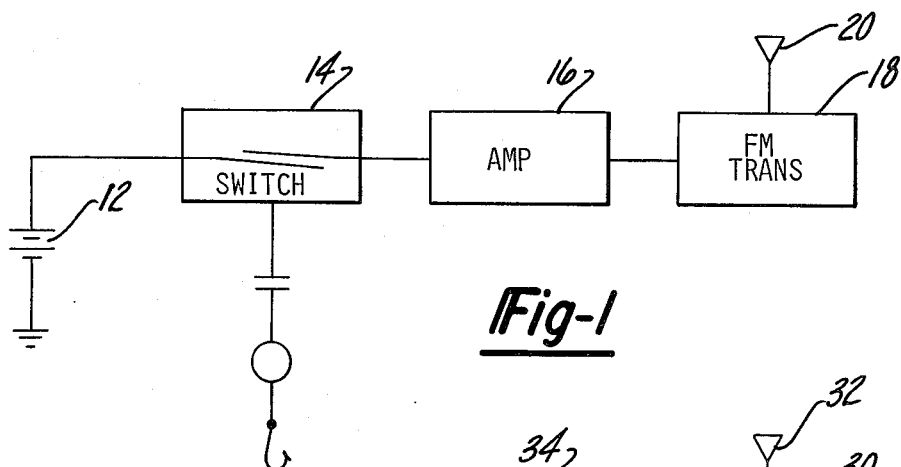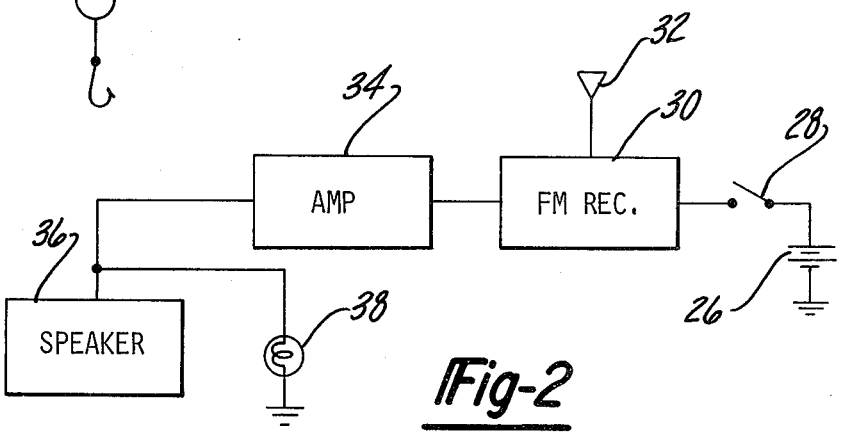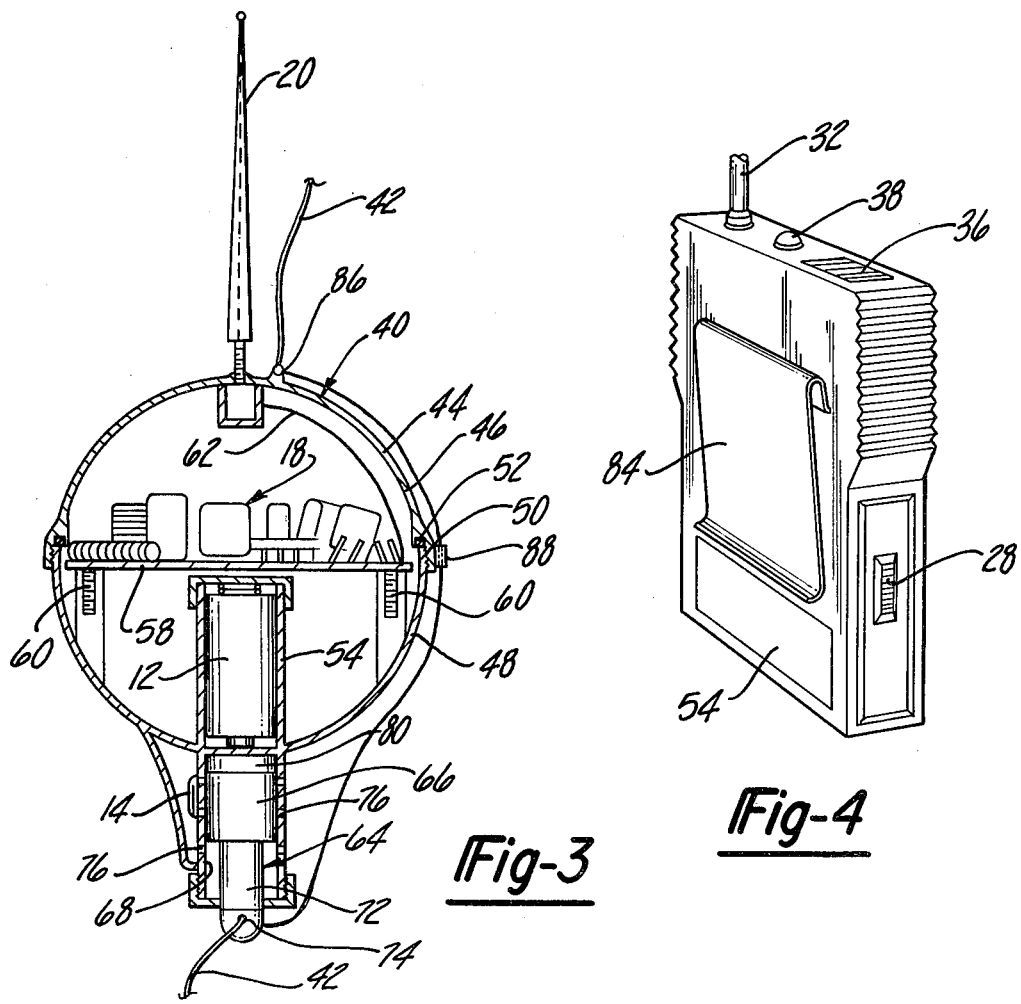

FISH DETECTING SYSTEM

This invention relates to fishing equipment and more particularly to an electronic fish detecting system.

In some forms of fishing, it is common to use a float or bobber which is attached at an intermediate point to a line extending between the bait or lure and the pole or rod. The bobber is watched continuously for telltale movement indicating activity by a fish. Unfortunately, the movement sometimes can go unnoticed due to momentary inattention or poor visibility.

It is an object of the invention to provide a fish detecting system in which fish activity can be detected at a point remote from the location of the fishing tackle without requiring continuous observation.

It is still another object of the invention to provide a fish detecting system in which fish activity is signaled either audibly or visually or both.

Still another object is to provide a fish detecting system in which signal transmitting means are attached to a fishing line to respond to a pull on the line and signal receiving means can be located remotely from the fishing line.

The objects of the invention are accomplished by a fish detecting system in which a signal sending means is incorporated in a buoyant housing forming a spherical float or bobber. The signal sending means is a radio transmitter powered by a battery under the control of a normally open switch which is activated by a magnet moved in a path passing in proximity to the switch upon a pull on line attached to a control member supporting the magnet. The magnet is attracted by the metal end of the case of the battery to hold the control member in a switch open position until it is dislodged by pull on the line. This occurs when there is fish activity at the bait or the lure attached to the line. The transmitter is instantaneously and momentarily actuated to send a signal to a receiver remote from the fishing tackle. The receiver is a radio receiver which activates an audible and/or visual alarm signalling fish activity. The float housing the radio transmitter also contains the power source in the form of a battery which acts as ballast to maintain the float with its radially extending antenna in an upright position.

The preferred embodiment of the invention is illustrated in the drawings in which:

FIG. 1 is a block diagram showing diagrammatically the signal sending means forming a part of the fish detecting system embodying the invention;

FIG. 2 is a diagrammatic view of the signal receiving means forming part of the fish detecting system of the invention;

FIG. 3 is a cross sectional view of the float arrangement incorporating the signal sending means; and FIG. 4 is a perspective view of the signal receiving means.

Referring to the drawings, the fish detecting system embodying the invention includes the signal sending means illustrated in FIG. 1 and a signal receiving means illustrated in FIG. 2.

The signal sending means has circuitry including a power source in the form of a battery 12, a normally open reed switch 14 which when closed provides a signal through an amplifier 16 to an FM transmitter 18. The FM transmitter 18 transmits a frequency modulated signal by way of an antenna 20 to remotely located signal receiving means shown in FIG. 2.

The signal receiving means includes a suitable power source such as a battery 26 connected in circuit with an on/off switch 28. In the "on" position of the switch 28, an FM receiver 30 is activated. Upon transmittal of a signal from the antenna 20, the FM receiver 30 receives the signal by way of an antenna 32. The signal is amplified by an amplifier 34 and then delivered to a speaker or other audible signal device 36 and also to a lamp or light emitting diode 38.

The signal sending means of FIG. 1 is incorporated in a bobber or float 40 best seen in FIG. 3. The float 40 is attached to a fishing line 42 which forms part of the fishing tackle such as a pole or rod which is not shown. The float 40 has a generally spherical housing 44 made up of an upper shell 46 and a lower shell 48. The shells 46 and 48 are joined together by mating threads indicated at 50. A rubber seal 52 is provided adjacent to the threads to sealingly isolate the interior of the housing 44 from the water in which the bobber 40 is intended to float. The lower shell 48 of the housing 44 includes a battery compartment 54 appropriately shaped to receive the battery 12. When the battery 12 is disposed in the compartment 54, it acts as ballast to maintain the floating attitude of the bobber or float relatively stable.

The lower shell 48 also supports the FM transmitter 18 in proximity to the battery compartment 54. The transmitter 18 includes a mounting board 58 held in position relative to the shell 48 by fasteners 60. The transmitter 18 has a predetermined signal frequency and a limited range. The upper shell 46 of the housing 44 supports the antenna 20 which is connected by a lead 62 to the transmitter 18.

The lower shell 48 of the housing 44 supports a hollow control plunger 64 which has a piston-like head 66 slidably supported in the bore 68 of a plunger cylinder extending radially of the sphere shaped housing 44. The head 66 is provided with a stem 72 which projects through the open end of the cylinder. The end of the stem 72 is provided with an opening 74 which affords fastening means for the fishing line 42. The cylinder is provided with a plurality of radially extending openings 76 which admit water into the cylinder when the float 40 is placed in the water.

Disposed on one side of the cylinder is a reed switch 14 which as previously described is in normally open position and is connected in a circuit between the battery 12 and the transmitter 18. The reed switch 14 is moved from its normally open position to a closed position and is connected in a circuit between the battery 12 and the transmitter 18. The reed switch 14 is moved from its normally open position to a closed position in response to the magnetic field of a magnet 80 when the magnet is in close proximity to the reed switch. The magnet 80 is mounted on the head 66 of the control plunger 64. When the control plunger 64 is moved downwardly, for example, in response to a pull on the line 42, the magnet passes in a path in close proximity to the reed switch 14 causing the reed switch to move to its closed position and to complete the circuit between the battery and the transmitter to actuate the transmitter to send a signal to the receiver 30.

The magnet acts also to hold the control plunger 64 in its initial or normal position in spaced relationship to the reed switch 14. This is due to the magnetic attraction of the magnet 80 and the metal case of the battery 12 in compartment 54. Upon movement of the control plunger 64 downwardly, the magnet 80 is moved away from the attraction of the battery 12 and passes in proximity to the reed switch 14 to move it to a closed position. Continued pull on the stem 72 moves the magnet beyond the reed switch 14 which permits the reed switch to return to an open position to open the circuit between the battery 12 and the transmitter 18. The control plunger 64 remains in its second position as long as pull is maintained on line 42 and control plunger 64.

The transmitter 18 is instantly actuated when the reed switch 14 is moved to its closed position and has a regulated frequency with a range up to one hundred feet or more. The signal from the transmitter 18 radiates from the antenna 20 to the antenna 32 of the receiver 40 and is subsequently amplified and delivered to the speaker 36 and lamp 38. The battery 26, switch 28, receiver 30, antenna 32, amplifier 34, speaker 36 and lamp 38 are all incorporated in a pocket-sized housing 82 the rear of which is provided with a bracket 84 which may be attached to the clothing of the fisherman.

The fish detecting system is employed by fastening the line 42 to the bobber or float 40. Preferably this is done by passing the line through an eye 86 formed on the exterior of the float 40 in substantially diametrically opposed relationship to the control plunger 64. The line 42 is threaded through the eye at the top of the float 40 and through a guide eye 88 formed on the shell 46 adjacent to the threaded connection 50 and to the end of the stem 72 of the control plunger 64. The line 42 preferably is fixed to the end of the stem 72. In use the line 42 extending from the fishing pole or rod is used to cast the float 40 to a desired position in the water where it will float in an upright position due to the weight of the battery 12 which acts as ballast to maintain the attitude of the float during use.

During the time that the float 40 is being cast to its position in the water, the control plunger 64 may have moved to its lower most position. However, when the float 40 enters the water the buoyancy of the hollow control plunger 64 and the water emitted through the openings 76 in the sides of the cylinder 70 cause the control plunger 64 to float upwardly until the magnet 80 reaches its upper position and is held in that position by the magnetic attraction of the case of the battery 12.

With the float 40 in the water, the control plunger 64 in its initial upper position and with the line 42 properly threaded through the eyes 86, 88 and fastened to the stem 72, a strike or bite by a fish will cause movement of the plunger downwardly in a path which passes in proximity to the reed switch 14. In the instant that the magnet 80 passes the reed switch 14, it is closed to instantly activate the transmitter 18 and the magnet then passes to a lower position permitting the reed switch 14 to return to its normally open position. During the instant that the transmitter 18 is activated a signal is sent to the receiver 30. With the switch 28 in its "on" position the receiver 30 is in condition to receive any signals from the transmitter 18. The receiver 30 can be of a type that once actuated, continues to send an audible signal by way of the speaker 36 and a visual signal by way of the lamp 38 for some predetermined period of time, for example, ten seconds. The audible or visual signal is made known to the fisherman who may then attend to the line 42 and withdraw the float 40 from the water for removal of any fish that may have been caught or to replace bait. At that time the magnet 80 will be in its second position with the reed switch 14 open. To reuse the float 40 it is merely necessary to recast the float to a desired position in the water and the buoyant plunger 64 will float upwardly in the cylinder 70 to place the magnet 80 in proximity to the end of the battery 12 to hold the control plunger 64 in readiness for another cycle of operation.

In the event that a fish causes only a momentary pull on the line 42 and then releases the line, the receiver 30 will be operated to afford a signal to the fisherman. However, the buoyancy of the control plunger 64 will cause it to return upwardly so that the magnet 80 is in proximity to the end of the battery 12 and the reed switch 14 will be in its open position. However, the fisherman will have been alerted and can observe that the bobber or float 40 remains floating in the normal position. This advises the fisherman that the fish did not make a strike and become attached to the bait or lure at the end of the line 42. Under such conditions, the fish detecting system is in readiness for operation and need not be reset.

A fish detecting system has been provided in which fish activity is detected and a signal transmitted to a point remote from the fishing tackle to give either an audible or a visual signal or both, to alert the fisherman to the fish activity without the need to maintain constant observation of the fishing tackle.

The embodiments of the invention in which an exclusive property or privilege is claimed are defined as follows:

1. A fish detecting system for use with fishing tackle, comprising: signal sending and signal receiving means, said signal sending means including a spherical, bouyant housing containing a radio transmitter, a battery disposed in a lower portion of said housing and forming a source of power for said transmitter, a normally open switch disposed in a circuit between said battery and said transmitter, a plunger movable radially of said sphere between first and second positions in a path passing in proximity to said switch, said plunger including a magnet operable to move said switch to a closed position to actuate said transmitter when said magnet moves into proximity of said switch and to hold said plunger in a first position when said switch is in said normal position and fastening means including an attaching portion on said plunger to receive a fishing line forming part of said tackle, said signal receiving means including a radio receiver operable at a point remote from said signal sending means to receive a signal from said transmitter and activate an alarm upon movement of said plunger from said first towards a second position upon pull on said fishing line.

2. The fish detecting system of claim 1 wherein said plunger is buoyant and floats from said second position to said first position in the absence of a pull on said fishing line.

3. The fish detecting system of claim 1 wherein said housing includes magnetic material positioned to be in proximity to said magnet when said plunger is in said first position.

4. The fish detecting system of claim 3 wherein said battery has a metallic case forming said magnetic material holding said plunger in said first position.

5. The fish detecting system of claim 1 wherein an antenna is connected to said transmitter and extends from said housing to a point diametrically opposite from said plunger.

6. The fish detecting system of claim 1 wherein said fastening means includes a line receiving eye formed on the exterior of said housing at a point substantially diametrically opposite said plunger to slidably receive said line, said line being fixed to said attaching portion on said plunger.

7. The fish detecting system of claim 1 wherein said plunger is supported at a point exterior of said housing to extend radially therefrom.

8. The fish detecting system of claim 1 wherein said alarm of said signal receiving means is audible.

9. The fish detecting system of claim 1 wherein said alarm of said signal receiving means is visual.

10. The fish detecting system of claim 1 wherein said signal receiving means is contained within a housing including a bracket means for attaching said receiving means to the clothing of an operator.

* * * * *